(12) United States Patent
Wang et al.

(10) Patent No.: US 9,052,087 B2
(45) Date of Patent: Jun. 9, 2015

(54) DISPLAY AND PROJECTION DEVICE

(71) Applicants: Sze-Ke Wang, Hsin-Chu (TW);
Chien-Chung Liao, Hsin-Chu (TW);
Chin-Ku Liu, Hsin-Chu (TW)

(72) Inventors: Sze-Ke Wang, Hsin-Chu (TW);
Chien-Chung Liao, Hsin-Chu (TW);
Chin-Ku Liu, Hsin-Chu (TW)

(73) Assignee: Young Lighting Technology Inc.,
Hsin-Chu (TW)

( * ) Notice: Subject to any disclaimer, the term of this patent is extended or adjusted under 35 U.S.C. 154(b) by 235 days.

(21) Appl. No.: 13/674,966

(22) Filed: Nov. 13, 2012

(65) Prior Publication Data
US 2013/0265801 A1 Oct. 10, 2013

(30) Foreign Application Priority Data

Apr. 9, 2012 (CN) .......................... 2012 1 0100726

(51) Int. Cl.
| | |
|---|---|
| *F21V 5/04* | (2006.01) |
| *G03B 21/14* | (2006.01) |
| *G03B 21/20* | (2006.01) |
| *G02F 1/1335* | (2006.01) |
| *H04N 9/31* | (2006.01) |
| *G02B 27/00* | (2006.01) |
| *G02B 7/14* | (2006.01) |
| *G02B 13/16* | (2006.01) |

(52) U.S. Cl.
CPC . *F21V 5/04* (2013.01); *G03B 21/14* (2013.01);
*F21V 5/045* (2013.01); *G03B 21/2066*
(2013.01); *G02F 1/133606* (2013.01); *H04N 9/3141* (2013.01); *H04N 9/3173* (2013.01);
*G02B 27/0081* (2013.01); *G02B 7/14*
(2013.01); *G02B 13/16* (2013.01)

(58) Field of Classification Search
CPC .. G03B 21/14; G03B 21/134; G03B 21/2006;
G03B 21/2013; G03B 21/2033; G02B
27/0081; G02B 13/16; G02B 7/14; G02F
1/133603; G02F 1/133606; G09G 3/18;
H04N 9/3173; H04N 9/3141; H04N 5/74;
F21V 5/045; F21V 5/04
USPC .................... 362/602, 620, 626; 353/39, 122
See application file for complete search history.

(56) References Cited

U.S. PATENT DOCUMENTS

| | | | | |
|---|---|---|---|---|
| 6,478,453 | B2* | 11/2002 | Lammers et al. | ............. 362/294 |
| 6,930,669 | B2 | 8/2005 | Weiner et al. | |

(Continued)

FOREIGN PATENT DOCUMENTS

| | | |
|---|---|---|
| CN | 1285965 | 11/2006 |
| CN | 1877374 | 12/2006 |
| CN | 101785320 | 7/2010 |

OTHER PUBLICATIONS

"Office Action of China Counterpart Application", issued on Nov. 15, 2014, p. 1-p. 11, in which the listed references were cited.

*Primary Examiner* — Y M Lee
(74) *Attorney, Agent, or Firm* — Jianq Chyun IP Office (57) ABSTRACT

A display and projection device includes a first shell, a display module, a projection light valve, and a projection lens. The first shell has a display surface and a non-display surface. The display module is disposed within the first shell. The display surface of the first shell exposes the display module. The projection light valve is disposed within the first shell and capable of emitting an image light beam, and the non-display surface of the first shell exposes the projection light valve. The projection lens is disposed outside of the first shell and is located at a transmission path of the image light beam. The projection lens is detachably connected with the non-display surface of the first shell. Moreover, a projection device including a Fresnel lens is also provided.

30 Claims, 6 Drawing Sheets

(56) References Cited

U.S. PATENT DOCUMENTS

| | | |
|---|---|---|
| 7,110,052 B1 | 9/2006 | Faris et al. |
| 7,641,348 B2 | 1/2010 | Yin et al. |
| 7,862,185 B2 * | 1/2011 | Noba ............................. 353/39 |
| 7,874,683 B2 | 1/2011 | Noba |
| 2006/0291253 A1 * | 12/2006 | Kim et al. ..................... 362/620 |
| 2009/0051831 A1 * | 2/2009 | Bierhuizen et al. ............... 349/5 |
| 2009/0262306 A1 * | 10/2009 | Quinn et al. .................... 353/39 |
| 2012/0268648 A1 * | 10/2012 | Yang ............................. 348/360 |

* cited by examiner

DISPLAY AND PROJECTION DEVICE

CROSS-REFERENCE TO RELATED APPLICATION

This application claims the priority benefit of China application serial no. 201210100726.3, filed on Apr. 9, 2012. The entirety of the above-mentioned patent application is hereby incorporated by reference herein and made a part of this specification.

TECHNICAL FIELD

The invention relates to an optical device, in more particularly, to a display and a projection device.

BACKGROUND

Following the advances of information technology developments, projection devices with display and body are dazzlingly abundant, for instance, Notebooks. A conventional Notebook usually includes a body, a cover configuring with Liquid Crystal Display (LCD) and a hinge connecting the body with the cover. A keypad for entering information is usually configured on the body, and the liquid crystal display is used for displaying image, text and video information.

Conventional Notebooks are gradually developed towards the trends of lightweight, thin and small products, wherein the size of the liquid crystal display is also designed to be smaller and smaller. However, it easily causes user's eyes discomfort to operate Notebook with a smaller size for a long time. In addition, Notebook with a smaller display area is also not convenient for simultaneously browsing with several people, in particular, when Notebook is used in a meeting occasion or for a video watching. For resolving the above-mentioned problems, the Notebook is usually able to connect with an external projector. The Notebook connecting with projector may project information on a larger screen, so as to enable multiple users to simultaneously receive the information in the Notebook. Nevertheless, the volume of the conventional projector is huge, and thus is not easily portable. Moreover, the price of the conventional projector is also higher and thus making it difficult to be accepted and used by the average consumers.

Furthermore, U.S. Pat. No. 7,641,348 and U.S. Pat. No. 6,930,669 describe a combination of a miniature projector and a Notebook; however, the combination of the miniature projector and the Notebook disclosed in the two related arts inevitably increases the thickness of the Notebook, reducing the advantages of being thin and lightweight of the Notebook. U.S. Pat. No. 7,874,683 discloses a projection module used in the application of mobile phone. U.S. Pat. No. 7,110,052 discloses a portable computer system with a projection mode.

SUMMARY OF THE INVENTION

The invention provides a display and projection device having an advantage of being easily portable.

Other objectives and advantages of the invention may be better understood through the technical features disclosed below.

For at least achieving the foregoing objectives, the invention provides a display and projection device. The display and projection device includes a first shell, a display module, a projection light valve, and a projection lens. The first shell has a display surface and non-display surface connecting with the display surface. The display module is disposed within the first shell, and the display surface of the first shell exposes the display module. The projection light valve is disposed within the first shell and capable of emitting an image light beam, and the non-display surface of the first shell exposes the projection light valve. The projection lens is disposed outside the first shell and is located on a transmission path of the image light beam, and the projection lens is connected with the non-display surface of the first shell.

In an embodiment of the invention, the display and projection device further comprises a projection light source disposed within the first shell and located between the display module and the projection light valve. The projection light source comprises a first light emitting element capable of emitting a first illumination light beam and a first light guide element disposed on a transmission path of the first illumination light beam, wherein the first illumination light beam is converted into the image light beam through the projection light valve.

In an embodiment of the invention, the first light guide element has a first light emitting surface facing towards the projection light valve, a first surface disposed opposite to the first light emitting surface and facing towards the display module, and a first light incident surface connecting the first light emitting surface with the first surface, wherein the first illumination light beam enters the first light guide element from the first light incident surface and propagates to the first surface, and the first illumination light beam propagated to the first surface leaves the first light guide element from the first light emitting surface.

In an embodiment of the invention, the first light guide element further comprises a plurality of optical micro-structures disposed on the first surface. The optical micro-structures are a plurality of caves, and each of the caves has an oblique plane inclined relative to the first surface. The first light emitting surface has a plurality of optical micro-structures.

In an embodiment of the invention, the display and projection device further comprising a Fresnel lens disposed on the transmission path of the image light beam and located within the projection lens.

In an embodiment of the invention, the Fresnel lens is disposed between the projection light valve and the projection lens.

In an embodiment of the invention, the display and projection device further comprises a first fixture fixed on the non-display surface of the first shell and located between the projection light valve and the projection lens; and a second fixture, fixed on the projection lens and used for connecting with the first fixture.

In an embodiment of the invention, the first fixture is a first magnet, and the second fixture is a second magnet.

In an embodiment of the invention, the projection lens has a first screw thread. An interior wall of the non-display surface of the first shell has a second screw thread. And the projection lens is fixed on the non-display surface of the first shell by threadedly connecting the first screw thread with the second screw thread.

In an embodiment of the invention, the display and projection device further comprises a shaft and a second shell. The first shell and the second shell respectively pivot on the shaft, wherein the shaft has a storage hole, and the storage hole is used for storing the projection lens.

In an embodiment of the invention, the display and projection device further comprises a shaft and a second shell. The first shell and the second shell respectively pivot on the shaft, wherein the second shell has a storage space.

In an embodiment of the invention, the display module comprises a display panel exposed by the display surface of the first shell, and a backlight source. The backlight source comprises a second light emitting element capable of emitting a second illumination light beam and a second light guide element having a second light emitting surface facing towards the projection light valve, a third light emitting surface facing towards the display panel and disposed opposite to the second light emitting surface, and a second light incident surface connecting the second light emitting surface with the third light emitting surface, wherein the second illumination light beam enters the second light guide element from the second light incident surface. A portion of the second illumination light beam propagates to the display panel through the third light emitting surface, and a portion of the second illumination light beam propagates to the projection light valve through the second light emitting surface, wherein the portion of the second illumination light beam propagated to the projection light valve is converted into the image light beam.

One embodiment of the invention provides a projection device. The projection device includes a first shell, a projection light valve, a projection lens, and a Fresnel lens. The projection light valve is disposed within the first shell and capable of emitting an image light beam. The first shell exposes the projection light valve. The projection lens is disposed outside of the first shell and is located on a transmission path of the image light beam. The projection lens is connected with the first shell. The Fresnel lens is disposed on the transmission path of the image light beam.

According to the foregoing descriptions, the projection lens is disposed with the first shell through the projection light valve and is enabling a design of externally attaching the projection lens onto the first shell, so as to enable the projection device to, in addition of having a projection function, also have an advantage of being easily portable.

In order to make the aforementioned and other features and advantages of the invention comprehensible, several exemplary embodiments accompanied with figures are described in detail below.

BRIEF DESCRIPTION OF THE DRAWINGS

The accompanying drawings are included to provide a further understanding of the invention, and are incorporated in and constitute a portion of this specification. The drawings illustrate embodiments of the invention and, together with the description, serve to explain the principles of the invention.

DETAILED DESCRIPTION OF DISCLOSED EMBODIMENTS

The foregoing and other technical contents, characteristics and effectiveness of the invention, in the following detailed descriptions of a preferred embodiment with reference to drawings, can be presented clearly. Directional terms mentioned in the following embodiments, such as top, bottom, left, right, before or after, is only referencing the directions in the drawings. Therefore, the directional terms are used for describing the disclosures, and the invention is not limited thereto.

First Embodiment

Figure 1A:
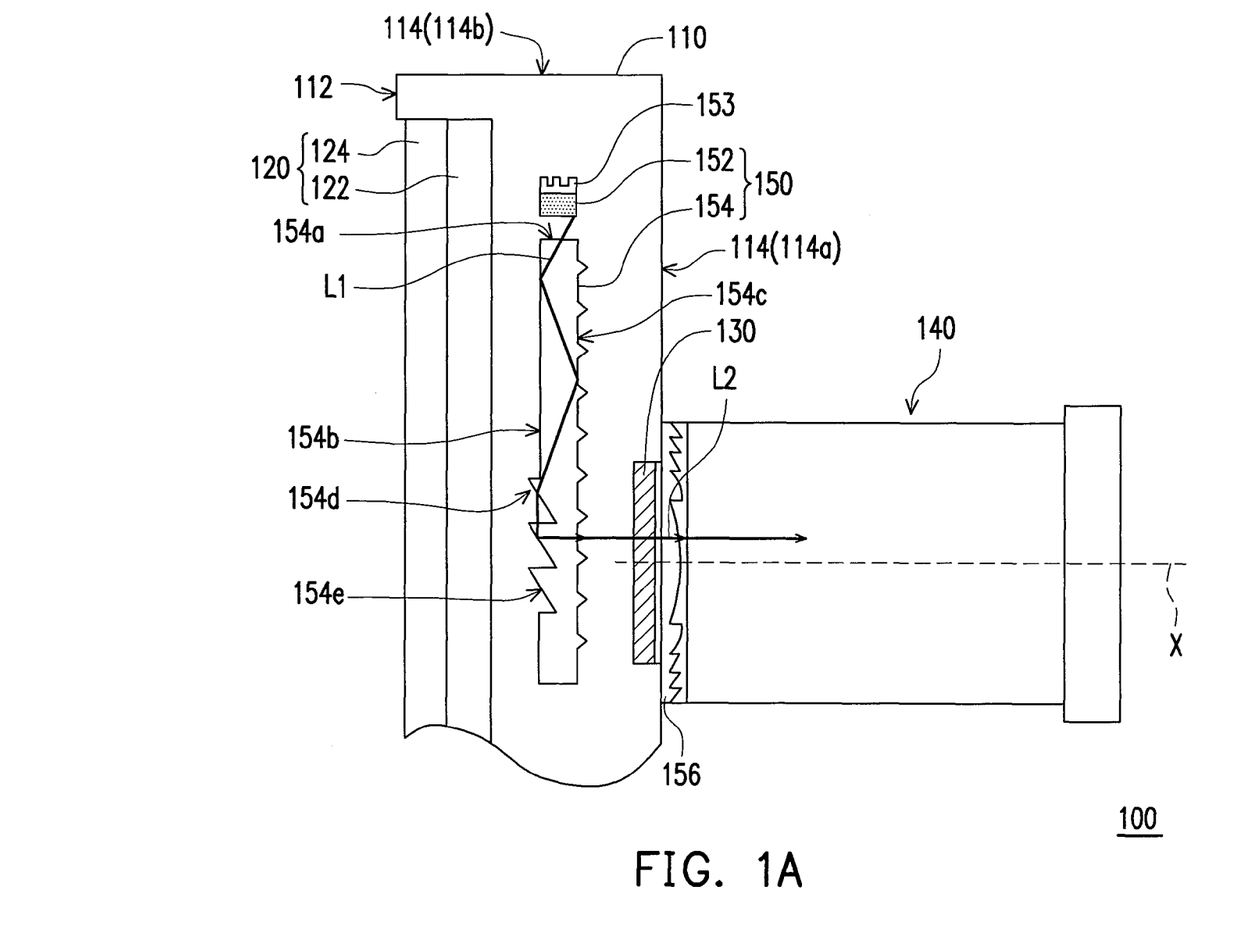
FIG. 1A is a partial schematic diagram illustrating a display and projection device in accordance with a first embodiment of the invention.

FIG. 1A is a partial schematic diagram illustrating a display and projection device in accordance with a first embodiment. Referring to FIG. 1A, the display and projection device 100 includes a first shell 110, a projection light valve 130 and a projection lens 140. In addition, the display and projection device 100 may selectively include a display module 120. The first shell 110 has a display surface 112 and a non-display surface 114 connecting with the display surface 112. The display module 120 is disposed within the first shell 110. The display surface 112 of the first shell 110 exposes the display module 120. In the embodiment, the display and projection device 100 may be Tablet PC, Notebook, or other electronic devices, but the invention is not limited thereto.

The display module 120 of the embodiment is, for example, a non-self-luminous display. In detail, the display module 120 of the embodiment includes a backlight source 122 and a display panel 124. The display surface 112 of the first shell 110 exposes the display panel 124. In the embodiment, the display panel 124 is, for example, Liquid Crystal Display Panel (LCD panel). However, the invention is not limited thereto; in other embodiment, the display module 120 may also be a self-luminous display module. For example, the self-luminous display module may include an organic electroluminescent display panel, while not include the backlight source.

The projection light valve 130 of the embodiment is disposed within the first shell 110 and capable of emitting an image light beam L2. The non-display surface 114 of the first shell 110 exposes the projection light valve 130. In the embodiment, the surface area of the projection light valve 130 is far smaller than the surface area of the display panel 124. For example, if the display panel 124 is 14 inches, then the projection light valve 130 is approximately 1 inch. In the embodiment, the projection light valve 130 may be Liquid Crystal Light Valve, Liquid crystal on silicon (LCOS), or Micro Electronic Mechanical System (MEMS) type light valve, but the invention is not limited thereto.

The projection lens 140 of the embodiment is disposed outside of the first shell 110 and located on a transmission path of the image light beam L2. The projection lens 140 is used to connect with the non-display surface 114 of the first shell 110. It is noted that the non-display surface 114, exposing the projection light valve 130 and connecting with projection lens 140, is not limited to a non-display surface 114*a* which is opposite to the display surface 112. In other embodiment, the non-display surface 114, exposing the projection light valve 130, is also a non-display surface 114*b*, connecting the non-display surface 114a with the display surface 112, and the projection lens 140 may also be connected with the non-display surface 114b.

Noteworthily, the projection lens 140 of the embodiment may be separated from the non-display surface 114 of the first shell 110. Namely, the projection lens 140 may be externally attached onto the first shell 110. When the user wants to use a projection function of the display and projection device 100, the user may install the projection lens 140 on the first shell 110. When the user is not in need of the projection function, the user may remove the projection lens 140 from the first shell 110, and thus the display and projection device 100 is easily portable. Moreover, the display and projection device 100 of the embodiment may further include a projection light source 150. The projection light source 150 and the projection light valve 130 of the embodiment are disposed within the first shell 110, and the projection lens 140 may be detachably connected with the first shell 110. In the other word, the first shell 110 does not need to be set aside for disposing the projection lens 140, and thus the first shell 110 (and display and the projection device 100) is easily thinned.

The projection light source 150 is disposed within the first shell 110 and located between the display module 120 and the projection light valve 130. The projection light source 150 is used for providing an illumination light beam L1. The illumination light beam L1, after passing through the projection light valve 130, may be converted into the image light beam L2. The image light beam L2 enters the projection lens 140 which is connected at the non-display surface 114, and the projection lens 140 projects pictures or other information carried by the image light beam L2 on to a screen (not shown).

In the other word, the backlight source 122 of the display module 120 and projection light source 150 of the embodiment may be independent of each other. In the embodiment, since the backlight source 122 and the projection light source 150 are independent of each other, the user may selectively turn on the backlight source 122 of the display module 120 or the projection light source 150 according to the need thereof, or may concurrently turn on the both. For example, the user may turn on the backlight source 122 of the display module 120 while turning off the projection light source 150 when wanting to use the display module 120 to display the pictures. On the other hand, the user may turn on the projection light source 150 while turning off the backlight source 122 when wanting to use the display and projection device 100 to project the pictures. Furthermore, the user may concurrently turn on the backlight source 122 of display module 120 and the projection light source 150 when wanting to use both the projection and display functions of the display and projection device 100.

The projection light source 150 of the embodiment is located within the first shell 110. The projection light source 150 may include a light emitting element 152 and a light guide element 154. The light emitting element 152 is used for providing the illuminating light beam L1, and the light guide element 154 is disposed on a transmission path of the illumination light beam L1. In detail, the light guide element 154 has a first light emitting surface 154c, a first surface 154b and a first light incident surface 154a. The first light emitting surface 154c faces towards the projection light valve 130. The first surface 154b is opposite to the first light emitting surface 154c and faces towards display module 120. The first light incident surface 154a connects the first light emitting surface 154c with the first surface 154b. The light emitting element 152 may be disposed next to the first light incident surface 154a. The illumination light beam L1 emitted from the light emitting element 152 may enter into the light guide element 154 through the first light incident surface 154a and propagate to the first surface 154b. The illumination light beam L1 propagated to the first surface 154b may leave the light guide element 154 from the first light emitting surface 154c.

In further detail, the light guide element 154 of the embodiment may have a plurality of optical micro-structures 154d. The optical micro-structures 154d are disposed at the first surface 154b. Or the optical micro-structures 154d are disposed on the first light emitting surface 154c shown in FIG. 1A (not numbered). The optical micro-structures 154d may be a plurality of caves in relative to the first surface 154b. Each of the caves may have an oblique plane 154e. The oblique plane 154e is inclined relative to the first surface 154b. From the macroscopic point of view, the optical micro-structures 154d may configure into a series of the serrated caves located on the first surface 154b.

Noteworthily, the projection light source 150 of the embodiment may utilize the optical micro-structures 154d to control a light emitting angle in relative to the first light emitting surface 154c for providing a highly collimated illumination light beam L1. In detail, the illumination light beam L1 may be firstly emitted to the optical micro-structures 154d on the first surface 154b during the propagation in the light guide element 154. When the illumination light beam L1 is emitted to the optical micro-structures 154d, the oblique planes 154e of the optical micro-structures 154d may enable the illumination light beam L1 to leave the light guide element 154 from the first light emitting surface 154c with a direction substantially normal to the first light emitting surface 154c. As a result, the illumination light beam L1 may propagate to the projection light valve 130 with a direction substantially normal to the projection light valve 130. The image light beam L2 converted by the projection light valve 130 may also enter into the projection lens 140 with a direction approaching the direction of an optical axis X of the projection lens 140, and thus the projection device 100 of the embodiment projects a better image.

Figure 1B:
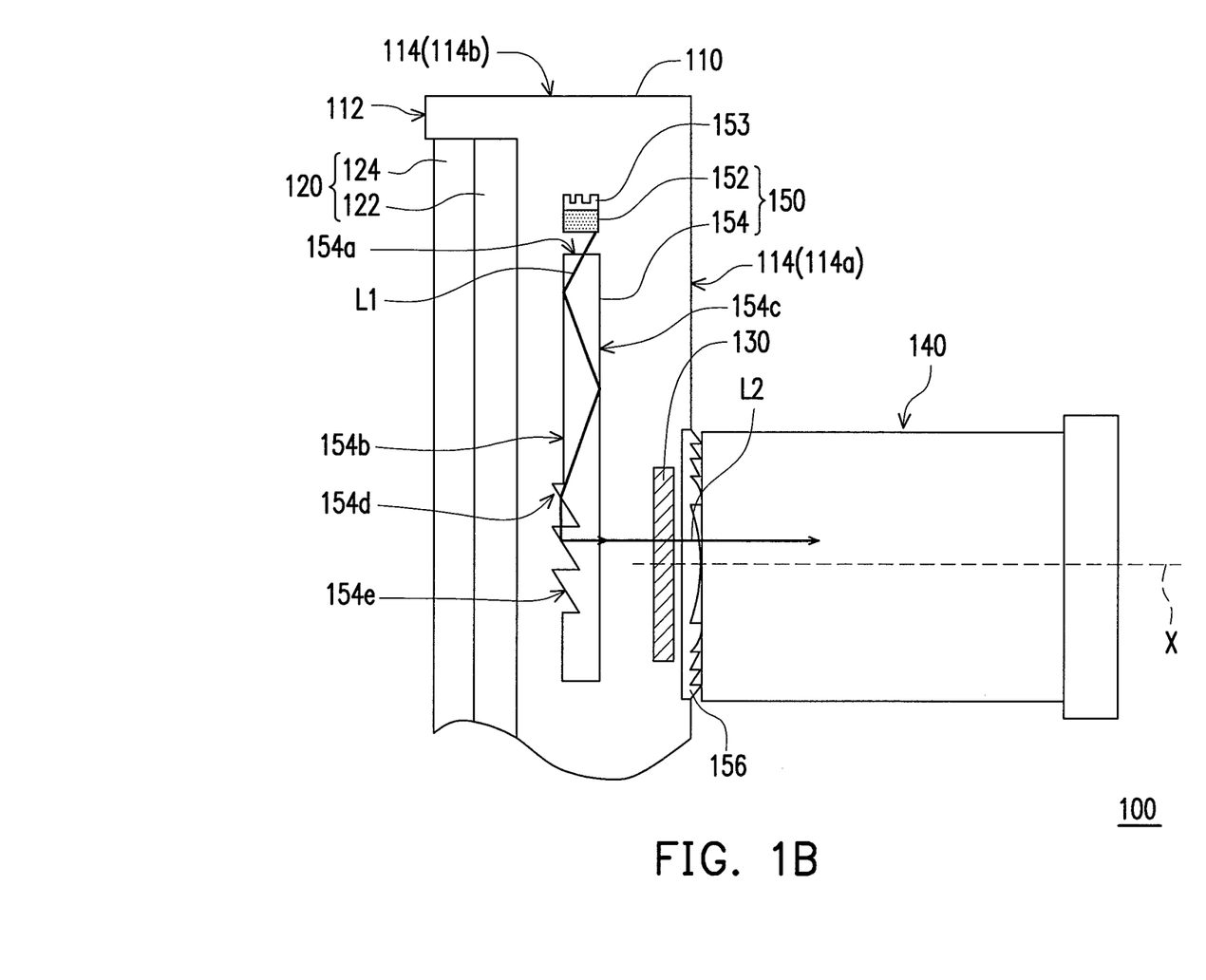
FIG. 1B is a partial schematic diagram illustrating a display and projection device in accordance with an alternative embodiment of the invention.

Referring to FIG. 1A, the display and projection device 100 of the embodiment may further includes a light concentrator disposed in the transmission path of the image light beam L2. The light concentrator is, for example, Fresnel lens 156. In the embodiment, the Fresnel lens 156 may be disposed within the projection lens 140. Noteworthily, by using the short focal length and the thin thickness characteristics of the Fresnel lens 156, the projection lens 140 may be designed even shorter, and thus the display and projection device 100 of the embodiment is much easily portable and removable. However, the invention is not limited hereto. In other embodiment, the Fresnel lens 156 may also be disposed at other suitable location. FIG. 1B is a partial schematic diagram illustrating a display and projection device in accordance with an alternative embodiment. Referring to FIG. 1B, in the embodiment, the Fresnel lens 156 may be disposed within the first shell 110 and located between the projection light valve 130 and the projection lens 140. The Fresnel lens 156, shown in FIG. 1B, may also exert similar effectiveness as the Fresnel lens 156, shown in FIG. 1A, and thus not repeated herein.

Referring to FIG. 1A, the display projection device 100 of the embodiment has a high-brightness light source, and the projection effect thereof may further be optimized. Namely, the light emitting element 152 of the projection light source 150 is better with a high-brightness light source. For example, the light emitting element 152 of the embodiment may be one or more high-power light-emitting diode. Nevertheless, the high-power light-emitting diode is easily to generate waste heat during operation, thus affecting the luminous power of the high-power light-emitting diode. In order to improve this problem, the display and projection device 100 of the embodiment may selectively include a heat dissipating element 153, which connects the light emitting element 152 and the first shell 110. In the embodiment, the heat dissipating element 153 is, for example, heat dissipating fins. The waste heat generated by the light emitting element 152 may be transferred to the first shell 110 through the heat dissipating element 153, and then instantly radiate into air. As a result, the projection light source 150 of the embodiment may provide more stable light source and longer service life. However, the invention is not limited thereto; in other embodiment, other heat dissipation method may also be employed, for example, disposing a fan (not shown) in the first shell 110. The fan may cause air flow and carry away the waste heat generated by the light emitting element 152.

Figure 2A:
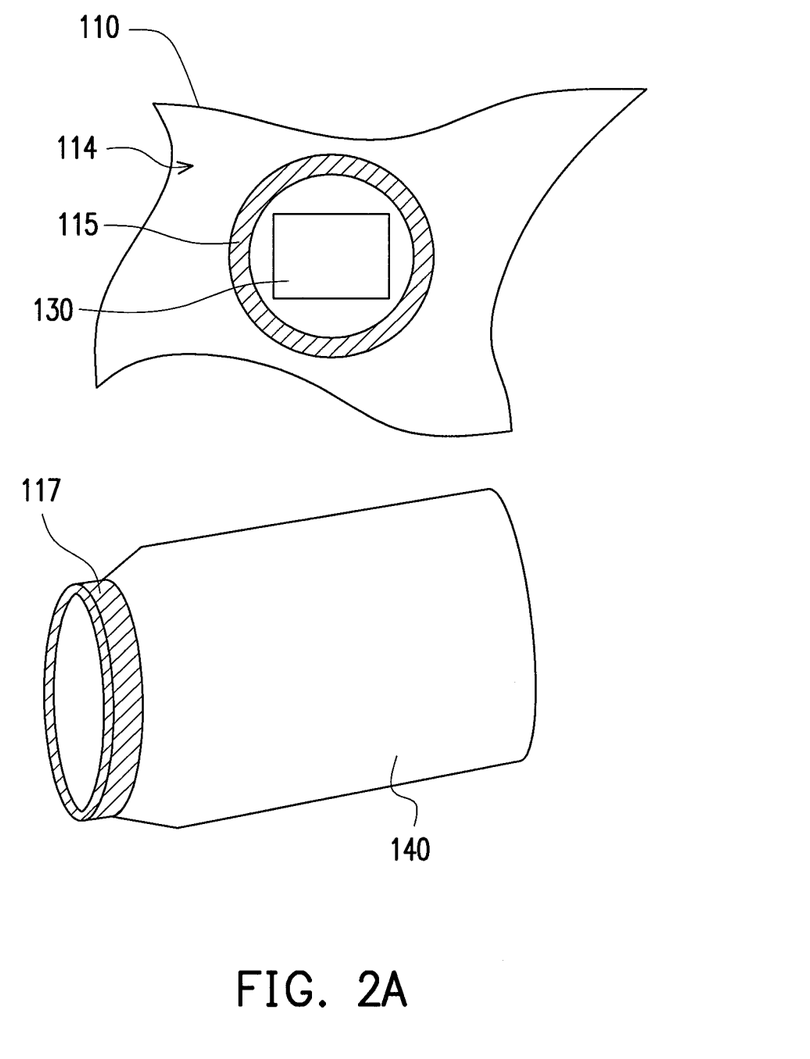
FIG. 2A illustrates a connection condition of a projection lens and a first shell in accordance with an embodiment of the invention.

FIG. 2A illustrates a connection condition of a projection lens and a first shell in accordance with an embodiment. Referring to FIG. 2A, top figure of FIG. 2A schematically shows a partial area of the non-display surface 114 in first shell 110, and the projection light valve 130 is exposed by the partial area of the non-display surface 114. The projection lens 140 is schematically shown at the bottom of FIG. 2A. In the embodiment, a first fixture 115 may be equipped on the non-display surface 114 of the first shell 110, and a second fixture 117 may be equipped at an end of the projection lens 140. In the embodiment, the first fixture 115 may be a first magnet, and the second fixture 117 may be a second magnet. The first magnet on the non-display surface 114 may be attracted to each other with the second magnet on the projection lens 140, thus fixing the projection lens 140 on the non-display surface 114. On the other hand, since the projection lens 140 of the embodiment uses the magnetic force to be fixed on the non-display surface 114, the user may also easily remove the projection lens 140, when is not in need of using the projection lens 140, thus separating the projection lens 140 from the non-display surface 114.

Figure 2B:
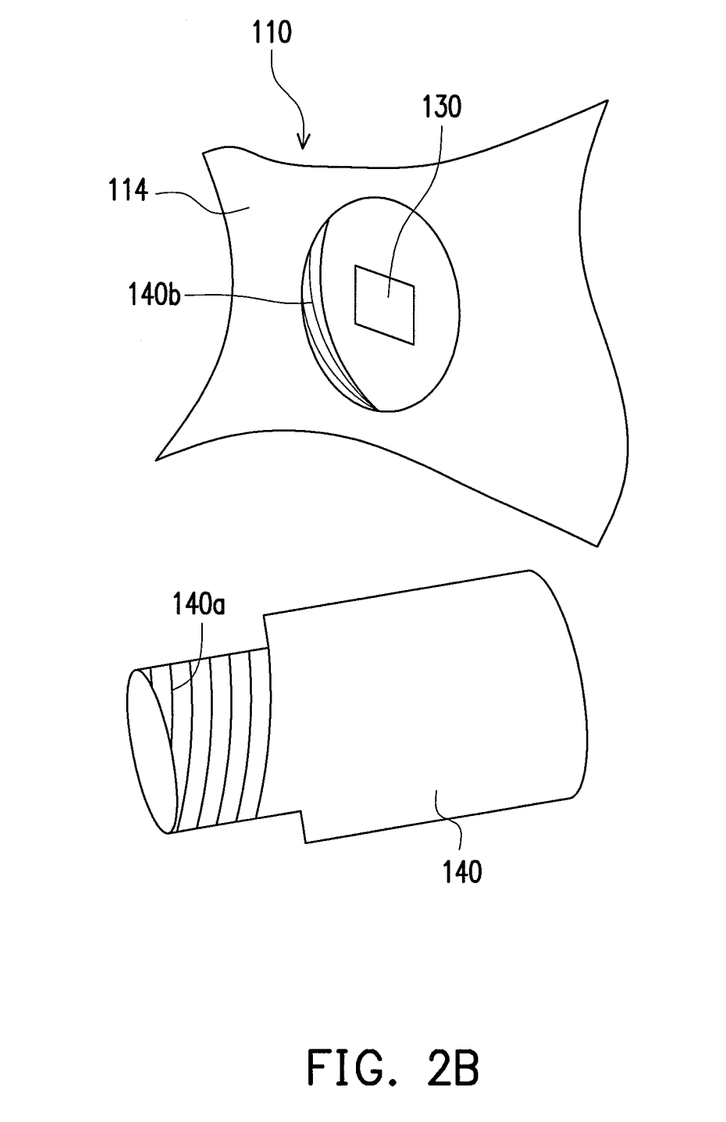
FIG. 2B illustrates a connection condition of a projection lens and a first shell in accordance with an alternative embodiment of the invention.

However, the invention is not limited to the aforesaid; in other embodiment, the projection lens 140 may also employ other method to connect to the first shell 110. FIG. 2B illustrates a connection condition of a projection lens and a first shell in accordance with an alternative embodiment. In the embodiment, as shown at the bottom of FIG. 2B, the projection lens 140 may have a first screw thread 140a. As shown at the top of FIG. 2B, an interior wall of the non-display surface 114 may have a second screw thread 140b. The projection lens 140 may be screwed into the non-display surface 114 of the first shell 110, by co-ordinately connecting the first screw thread 140a with the second screw thread 140b, and then the projection lens 140 is fixed on the non-display surface 114. For example, the interior wall of the non-display surface 114 may have a female thread, and the projection lens 140 may have a male thread. Through the engagement of the female thread and the male thread, the projection lens 140 is externally attached at the non-display surface 114 of the first shell 110. In addition, in other embodiment, the projection lens 140 may also be externally attached onto the first shell 110 using a wedging method (not shown).

Figure 3A:
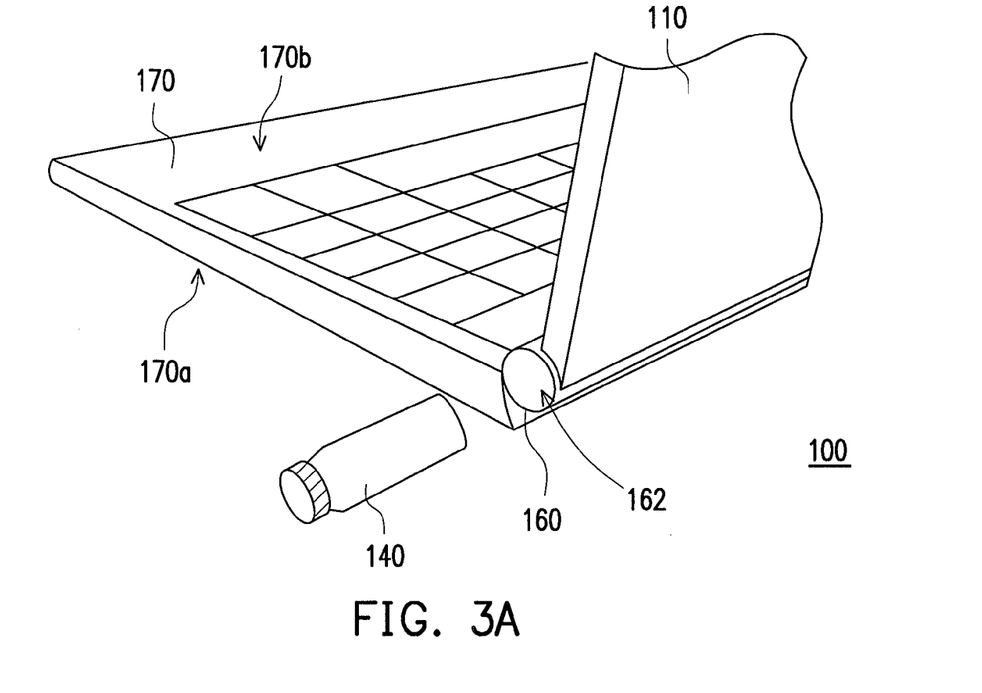
FIG. 3A illustrates a storage condition of a projection lens in accordance with an embodiment of the invention.

Since the projection light valve 130 and the projection lens 140 are detachable, an accommodation space may be designed with in the display and projection device 100 for storing the projection lens 140. FIG. 3A illustrates a storage condition of a projection lens in accordance with an embodiment. Referring to FIG. 3A, in the embodiment, the display and projection device 100 further includes a shaft 160 and a second shell 170. The first shell 110 and the second shell 170 respectively pivot on the shaft 160. The shaft 160 may have a storage hole 162. The storage hole 162 is suitable for storing the projection lens 140. Generally, the shaft 160 is a thicker portion in the display and projection device 100, and to store the projection lens 140 in the shaft 160 would not increase the maximum thickness of the display and projection device 100.

Figure 3B:
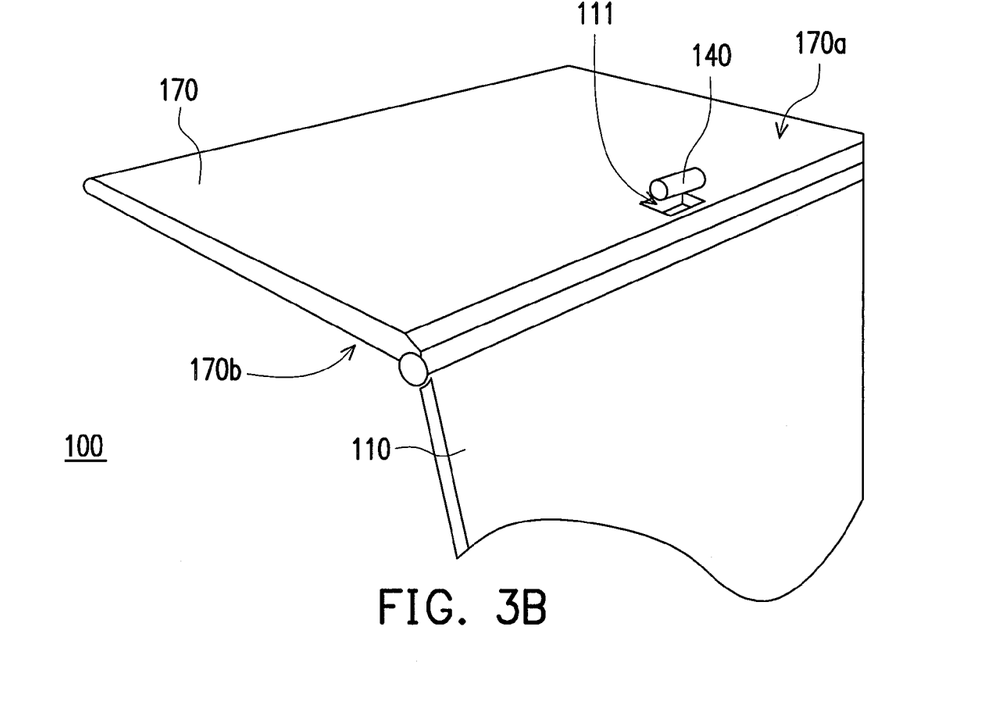
FIG. 3B illustrates a storage condition of a projection lens in accordance with an alternative embodiment of the invention.

However, the invention is not limited to the aforesaid; in other embodiment, the projection lens 140 may be also stored in other locations. FIG. 3B illustrates a storage condition of a projection lens in accordance with an alternative embodiment. Referring to FIG. 1B, the projection lens 140 may also be stored in the second shell 170 of the display and projection device 100. In detail, a storage space 111 may be disposed on a bottom surface 170a or a top surface 170b of the second shell 170, and the projection lens 140 may be stored in the storage space 111. In addition, the projection lens 140 of the embodiment may also be designed to be a retractable type in order to further reduce the space required for storing the projection lens 140.

Second Embodiment

Figure 4:
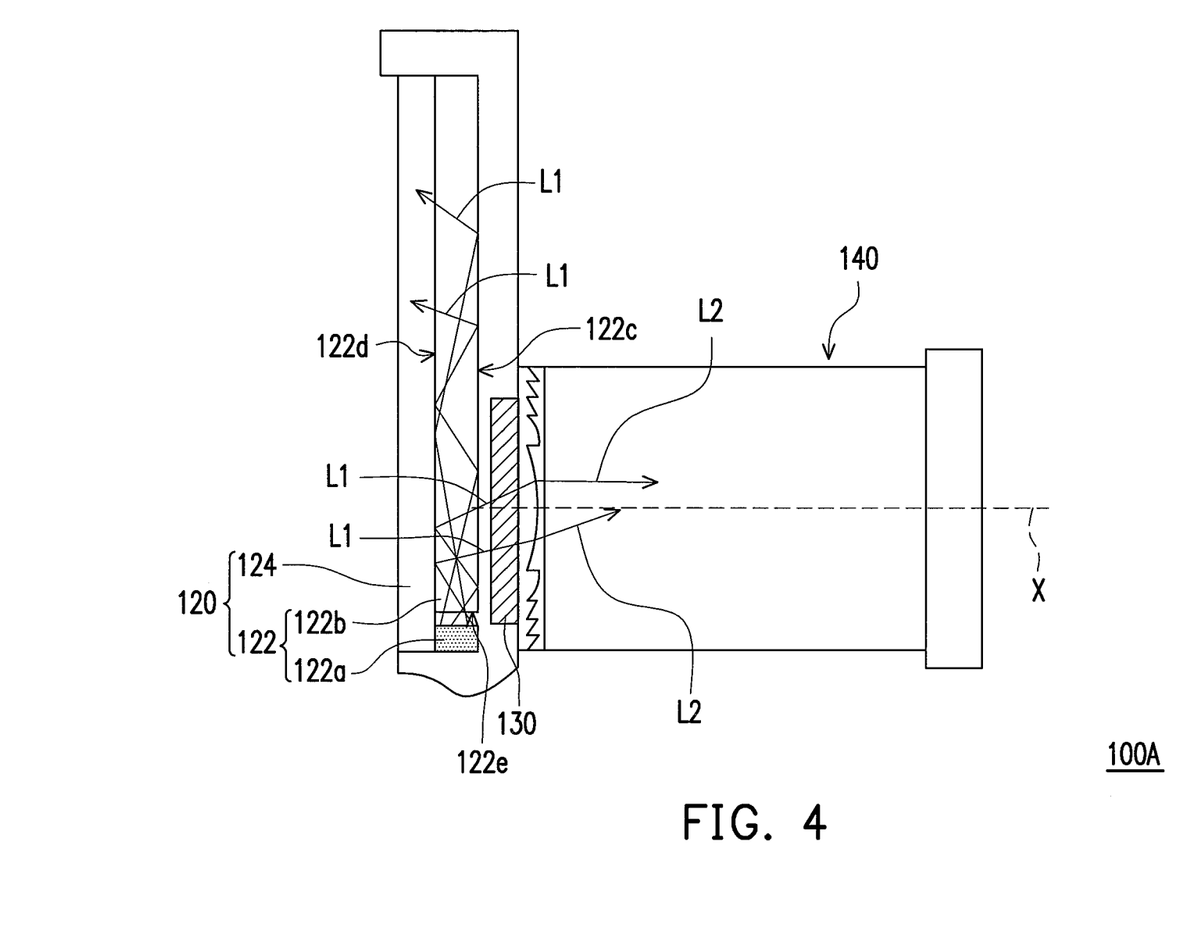
FIG. 4 is a partial diagram illustrating a display and projection device according to a second embodiment of the invention.

FIG. 4 is a partial diagram illustrating a display and projection device according to a second embodiment. Referring to FIG. 4, the display and projection device 100A of the embodiment is similar to the display and projection device 100 of the first embodiment; therefore, the same elements are indicated with the same symbols. The main difference between the display and projection device 100A of the embodiment and the display and projection device 100 of the first embodiment is that, in the embodiment, the display panel 124 and the projection light valve 130 share a same light source. The following descriptions are for illustrating the differences between the two devices, so that the similarities are not repeated.

The display module 120 of the embodiment includes a display panel 124 and a backlight source 122. The backlight source 122 includes a light emitting element 122a and a light guide element 122b. Noteworthily, the light guide element 122b has a second light emitting surface 122c facing towards the projection light valve 130, a third light emitting surface 122d facing towards the display panel 124 and opposite to the second light emitting surface 122c, and a second light incident surface 122e connecting the second light emitting surface 122c with the third light emitting surface 122d. After the illumination light beam L1 is emitted by the light emitting element 122a, the illumination light beam L1 enters the light guide element 122b from the second light incident surface 122e, wherein a portion of the illumination light beam L1 propagates to the display panel 124 through the third light emitting surface 122d, and the other portion of the illumination light beam L1 propagates to the projection light valve 130 through the second light emitting surface 122c. The portion of the illumination light beam L1 propagated to the projection light valve 130 is converted into the image light beam L2.

Specifically, partial regions on the second light emitting surface 122c and the third light emitting surface 122d of the light guide element 122b of the embodiment may be disposed with the optical micro-structures (not shown) for controlling a light emitting angle of the illumination light beam L1 leaving the light guide element 122b from the second light emitting surface 122c or the third light emitting surface 122d. In the other word, in the embodiment, the two portions of the illumination light beam L1 that correspondingly propagate to the display panel 124 and the projection light valve 130 are from the same source (the backlight source 122). Since, in the display and projection device 100A, light required by displaying and projecting pictures are generated from the backlight source 122 in the display module 120, the display and projection device 100A may further be designed to have two modes. One is a display mode, and the other is a projection mode. In detail, because the required brightness of light is high when the projection mode is turned on, the backlight source 122 of the display and projection device 100A may be adjusted to provide the illumination light beam L1 with high-brightness. When turning on the display mode, because the brightness of light required by the display panel 124 is lower than the intensity of light required by the projection screen, the illumination light beam L1 provided by the backlight source 122 may be adjusted to a lower condition.

In summary, the display and projection device of an embodiment through the design of disposing the projection light valve within in the shell and externally attaching the projection lens at the shell enables the display and projection device of the embodiment to, in addition of having a projection function, also have an advantage of being easily portable.

In addition, in an alternative embodiment, the projection device may replace the effect of conventional thick lens with the characteristics of the Fresnel lens, so as to further minimize the volume of the projection device of the embodiment.

The foregoing descriptions are only the embodiments of the invention, and can not be used to limit the scope of the invention. Namely, simple equivalent changes and modifications according to the claims and contents of the invention are still considered as within the scope of the invention. Furthermore, any embodiment or claim of the invention is not required to reach the entire objectives or advantages disclosed by the invention. In addition, the abstract and the title are only used for assisting the patent search, and are not intended for limiting the scope of the invention. Moreover, the term "first light emitting element", "second light emitting element", or "first fixture", "second fixture" and so on, mentioned in the specification are only used to indicate the names of the elements, and are not intended for limiting the maximum number or minimum number of the elements.

It will be apparent to those skilled in the art that various modifications and variations can be made to the structure of the invention without departing from the scope or spirit of the invention. In view of the foregoing, it is intended that the invention cover modifications and variations of this invention provided they fall within the scope of the following claims and their equivalents.

What is claimed is:

1. A display and projection device comprising:
    a first shell, having a display surface and a non-display surface connecting with the display surface;
    a display module, disposed within the first shell, and the display surface of the first shell exposing the display module;
    a projection light valve, disposed within the first shell to form an image light beam, wherein the projection light valve is located inside the non-display surface of the first shell and the image light beam is projected from the inside to the outside of the first shell; and
    a projection lens, disposed outside of the first shell and located on a transmission path of the image light beam, and the projection lens connected with the non-display surface of the first shell.

2. The display and projection device as recited in claim 1 further comprising a projection light source, disposed within the first shell and located between the display module and the projection light valve, and the projection light source capable of providing a first illumination light beam, wherein the first illumination light beam is converted into the image light beam through the projection light valve.

3. The display and projection device as recited in claim 2, wherein the projection light source comprises:
    a first light emitting element, capable of emitting the first illumination light beam; and
    a first light guide element, disposed on a transmission path of the first illumination light beam.

4. The display and projection device as recited in claim 3, wherein the first light guide element has a first light emitting surface facing towards the projection light valve, a first surface disposed opposite to the first light emitting surface and facing towards the display module, and a first light incident surface connecting the first light emitting surface with the first surface, wherein the first illumination light beam enters the first light guide element from the first light incident surface and propagates to the first surface, and the first illumination light beam propagated to the first surface leaves the first light guide element from the first light emitting surface.

5. The display and projection device as recited in claim 4, wherein the first light guide element further comprises a plurality of optical micro-structures disposed on the first surface.

6. The display and projection device as recited in claim 5, wherein the optical micro-structures are a plurality of caves, and each of the caves has an oblique plane inclined relative to the first surface.

7. The display and projection device as recited in claim 4, wherein the first light emitting surface has a plurality of optical micro-structures.

8. The display and projection device as recited in claim 1 further comprising a Fresnel lens, disposed on the transmission path of the image light beam.

9. The display and projection device as recited in claim 8, wherein the Fresnel lens is disposed within the projection lens.

10. The display and projection device as recited in claim 8, wherein the Fresnel lens is disposed between the projection light valve and the projection lens.

11. The display and projection device as recited in claim 1 further comprising:
    a first fixture, fixed on the non-display surface of the first shell and located between the projection light valve and the projection lens; and
    a second fixture, fixed on the projection lens and used for connecting with the first fixture.

12. The display and projection device as recited in claim 11, wherein the first fixture is a first magnet, and the second fixture is a second magnet.

13. The display and projection device as recited in claim 1, wherein the projection lens has a first screw thread, an interior wall of the non-display surface of the first shell has a second screw thread, and the projection lens is fixed on the non-display surface of the first shell by threadedly connecting the first screw thread with the second screw thread.

14. The display and projection device as recited in claim 1 further comprising a shaft and a second shell, and the first shell and the second shell respectively pivoting on the shaft, wherein the shaft has a storage hole, and the storage hole is used for storing the projection lens.

15. The display and projection device as recited in claim 1 further comprising a shaft and a second shell, and the first shell and the second shell respectively pivoting on the shaft, wherein the second shell has a storage space.

16. The display and projection device as recited in clam 1, wherein the display module comprises:
    a display panel, exposed by the display surface of the first shell;

a backlight source, comprising:
- a second light emitting element, capable of emitting a second illumination light beam;
- a second light guide element, having a second light emitting surface facing towards the projection light valve, a third light emitting surface facing towards the display panel and disposed opposite to the second light emitting surface, and a second light incident surface connecting the second light emitting surface with the third light emitting surface, wherein the second illumination light beam enters the second light guide element from the second light incident surface, a portion of the second illumination light beam propagates to the display panel through the third light emitting surface, and a portion of the second illumination light beam propagates to the projection light valve through the second light emitting surface, wherein the portion of the second illumination light beam propagated to the projection light valve is converted into the image light beam.

17. A projection device, adapted for incorporating to a display module, the projection device comprising:
- a first shell, having a display surface and a non-display surface connecting with the display surface, wherein the display module disposed within the first shell, and the display surface of the first shell exposing the display module;
- a projection light valve, disposed within the first shell to emit an image light beam, and the first shell exposing the projection light valve, wherein the projection light valve is located inside the non-display surface of the first shell and the image light beam is projected from the inside to the outside of the first shell;
- a projection light source, disposed within the first shell, wherein the projection light source is located between the display module and the projection light valve;
- a projection lens, disposed outside of the first shell and located on a transmission path of the image light beam, and the projection lens connected with the non-display surface of the first shell; and
- a Fresnel lens, disposed on the transmission path of the image light beam.

18. The projection device as recited in claim 17, wherein the Fresnel lens is disposed within the projection lens.

19. The projection device as recited in claim 17, wherein the Fresnel lens is disposed between the projection light valve and the projection lens.

20. The projection device as recited in claim 17, wherein the projection light source is capable of providing a first illumination light beam, and the first illumination light beam is converted into the image bean through the projection light valve.

21. The projection device as recited in claim 20, wherein the projection light source comprises:
- a first light emitting element, capable of emitting the first illumination light beam; and
- a first light guide element, disposed on an transmission path of the first illumination light beam.

22. The projection device as recited in claim 21, wherein the first light guide element has a first light emitting surface facing towards the projection light valve, a first surface disposed opposite to the first light emitting surface and facing towards the display module, and a first light incident surface connecting the first light emitting surface with the first surface, wherein the first illumination light beam enters the first light guide element from the first light incident surface and propagates to the first surface, and the first illumination light beam propagated to the first surface leaves the first light guide element from the first light emitting surface.

23. The projection device as recited in claim 22, wherein the first light guide element further comprises a plurality of optical micro-structures disposed on the first surface.

24. The projection device as recited in claim 23, wherein the optical micro-structures are a plurality of caves, wherein each of the caves has an oblique plane inclined relative to the first surface.

25. The projection device as recited in claim 22, wherein the first light emitting surface has a plurality of optical micro-structures.

26. The projection device as recited in claim 17 further comprising:
- a first fixture, fixed on the first shell and located between the projection light valve and the projection lens; and
- a second fixture, fixed on the projection lens for connecting with the first fixture.

27. The projection device as recited in claim 17, wherein the first fixture is a first magnet, and the second fixture is a second magnet.

28. The projection device as recited in claim 17, wherein the projection lens has a first screw thread, an interior wall of the first shell has a second screw thread, and the projection lens is screwed into the first shell by coordinately connecting the first screw thread with the second screw thread.

29. The projection device as recited in claim 17 further comprising a shaft and a second shell, and the first shell and the second shell respectively pivoting on the shaft, wherein the shaft has a storage hole for storing the projection lens.

30. The projection device as recited in claim 17 further comprising: a shaft and a second shell, and the first shell and the second shell respectively pivoting on the shaft, wherein the second shell has a storage space.

* * * * *